June 17, 1952
A. GAZDA
2,600,751
ILLUMINATED COMBINED OPTICAL MIRROR SIGNAL
DEVICE FOR VEHICLES AND THE LIKE
Filed Sept. 13, 1949
3 Sheets-Sheet 1
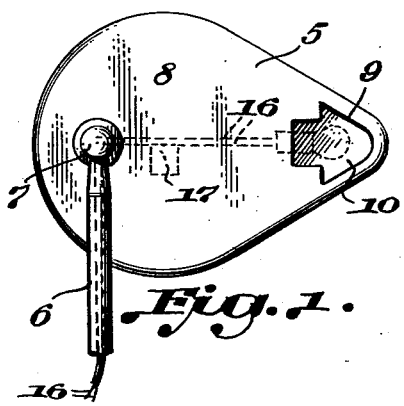
Fig. 1.
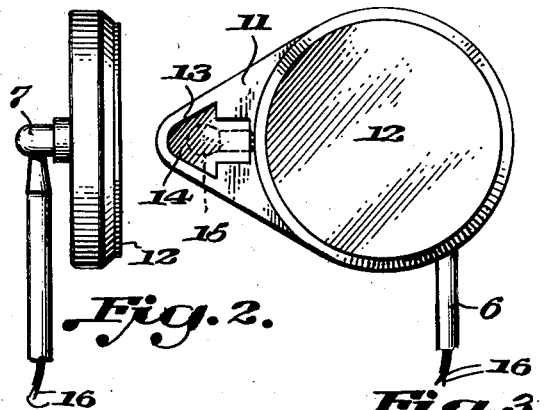
Fig. 2. Fig. 3.
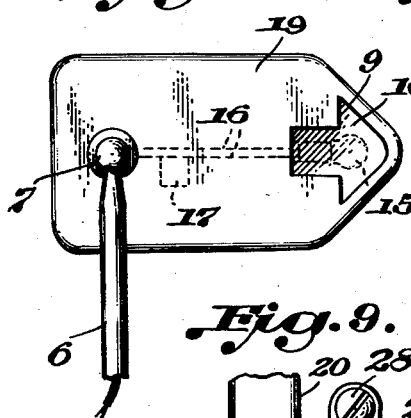
Fig. 4.
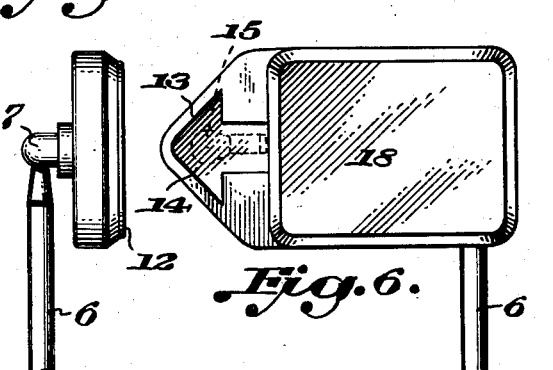
Fig. 5. Fig. 6.
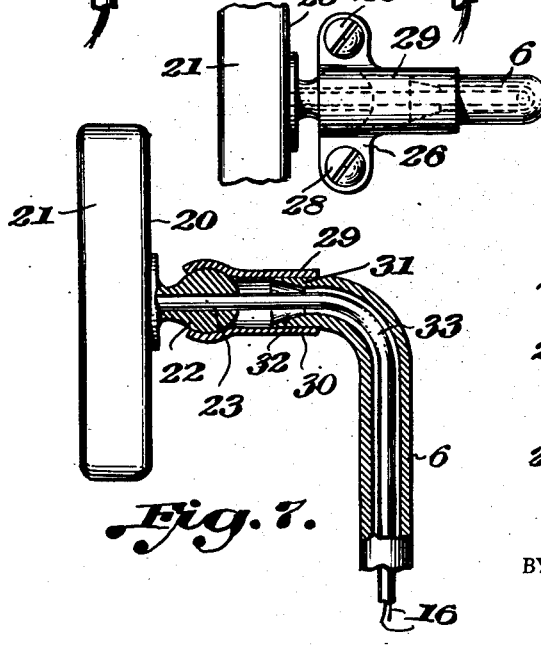
Fig. 9.
Fig. 7.
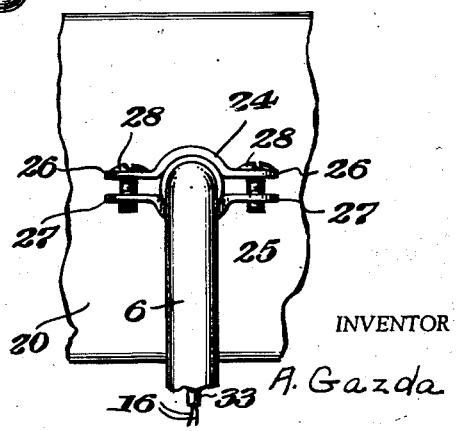
Fig. 8.
INVENTOR
A. Gazda
BY
C. F. Wenderoth
ATTORNEY

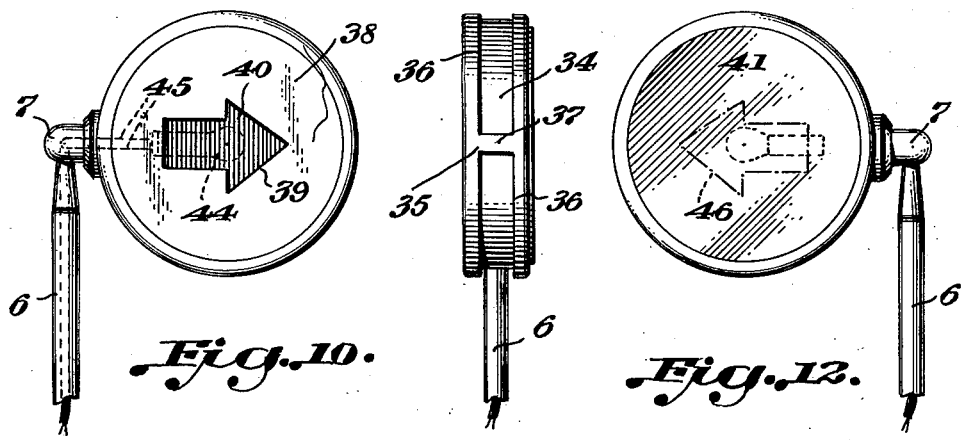
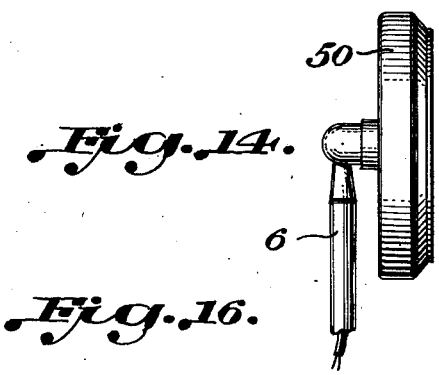
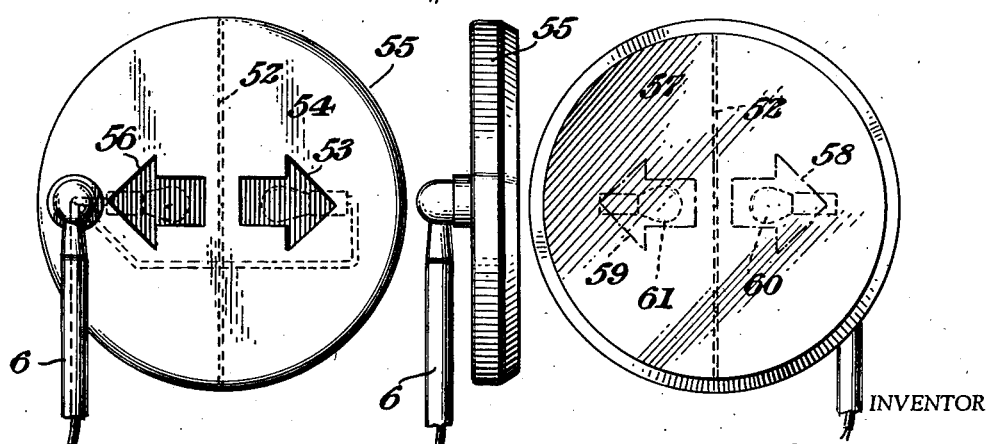

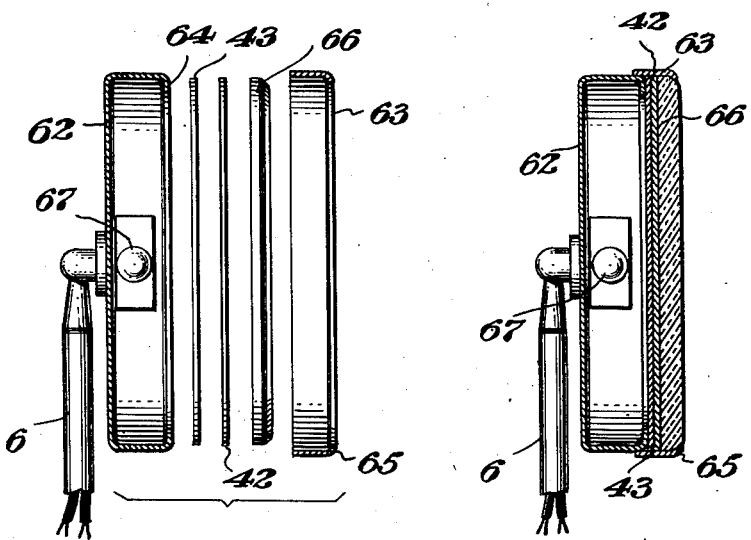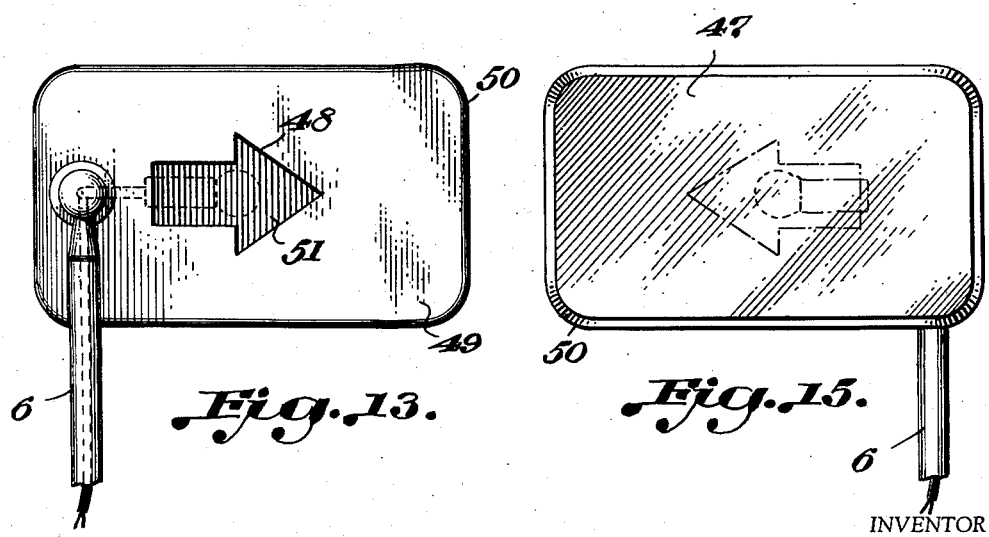

Patented June 17, 1952

2,600,751

UNITED STATES PATENT OFFICE 2,600,751

ILLUMINATED COMBINED OPTICAL MIRROR SIGNAL DEVICE FOR VEHICLES AND THE LIKE

Antoine Gazda, Providence, R. I.

Application September 13, 1949, Serial No. 115,533

2 Claims. (Cl. 177—329)

This invention relates to an illuminated combined mirror and signal device for automotive vehicles and the like.

In devices at present in use direction indicators are usually located at the right and the left at the front of a motor vehicle and also at the right and the left at the rear. This requires four direction indicating devices, and an object of the present invention is to reduce such number of indicating devices to two, and even to a single device.

A further object of the invention is to combine a rear view mirror with an illuminated direction indicator which is intermittently operated.

A still further object of the invention is to provide an improved bracket connection for a combined mirror and direction device wherein the leads for illuminating the direction device are led through the bracket itself and the universal mounting for the mirror.

With the above and other objects in view which will become apparent from the detailed description below, the invention is shown in the drawings, in which Figure 1 is a front view of a combined mirror and direction device as seen from the front of a vehicle;

Figure 2 is a side view of the divice shown in Figure 1;

Figure 3 is a rear view of the device shown in Figure 1 with the rear view mirror as seen from the rear of the vehicle;

Figure 4 is a modified construction;

Figure 5 is a side view of such modified construction;

Figure 6 is a rear view of the construction shown in Figure 4;

Figure 7 is a side view of the combined mirror and direction indicator showing particularly the bracket therefor partly in cross section and elevation;

Figure 8 is an elevational view illustrating the bracket connection;

Figure 9 is a plan view of the construction shown in Figure 8;

Figure 10 is a front view from the front of the vehicle showing a modified construction;

Figure 11 is a side view of the construction shown in Figure 10;

Figure 12 is a rear view of the construction shown in Figure 10 illustrating the rear view transparent mirror with the indicating indicia shown in dotted lines thereon;

Figure 13 is a front view of another modified construction;

Figure 14 is a side view of the construction shown in Figure 13;

Figure 15 is a rear view of the construction shown in Figure 13;

Figure 16 is a front view of a still further modification;

Figure 17 is a side view of the construction shown in Figure 16;

Figure 18 is a rear view of the construction shown in Figure 16; and

Figure 19 is an exploded view illustrating the manner of assembling the construction as shown particularly in Figures 13, 14 and 15.

Figure 20 is a cross-sectional view showing the assembled structure of Figure 19.

In the various figures similar reference characters are used to indicate like parts.

Referring to Figures 1, 2 and 3, a casing 5 is provided of the configuration shown, to the front of which is connected a mounting bracket 6 by a universal joint. 7. In the front face 8 as seen from the front of the vehicle, an arrow configuration 9 is cut out at the position indicated and at the interior of the face 8 such arrow is covered by a translucent member 10. The member 10 may be made preferably of a plastic translucent material of red color. The rear of the casing 5 has a face 11 in which is mounted an ordinary rear view mirror 12. The mirror 12 may be secured to the casing 5 in any suitable manner. At the side therof the face 11 has cut out therein an arrow configuration 13 and at the interior of the face 11 the arrow configuration 13 is also covered by a translucent material 14 preferably plastic and preferably of red color.

Located within the casing 5 is a light 15 connected to the leads 16 which extend through the center of the universal joint 7 and through the center of the bracket member 6. The bracket member 6 may have at the end, not shown, any means whatsoever for mounting the same upon the vehicle body and the leads 16 extend therethrough to the electric supply, such as a battery provided upon the vehicle.

The leads 16 also have preferably associated therewith a blinker device 17 so that when the indicating device is on such device is intermittently operated.

The device shown operates as follows. When the driver of the vehicle throws a switch to indicate a turn in one direction or the other, the light 15 is illuminated and will appear visible both at the front and at the rear of the vehicle. The blinker 17 will intermittently operate such light and attract attention thereto. Therefore, instead of the four indicating devices usually employed, only two are necessary, one located on each side of the vehicle and rear view mirrors are also associated therewith.

The modification shown in Figures 4, 5 and 6 is similar to the modification illustrated in Figures 1, 2 and 3 except that the mirror 18 is of rectangular configuration and the casing 19 is shaped to correspond therewith.

In Figures 7, 8 and 9 the improved bracket mounting for the combined direction indicator and mirror is shown. As indicated particularly in Figure 7, attached to the front face 20 of the casing 21 in any desired way is a spherical member 22 having a bore 23 extending therethrough leading to the interior of the casing 21. Mounted upon the member 22 are clamping members 24 and 25 having laterally extending apertured ears 26 and 27 respectively. The apertures in the ears 27 are threaded to cooperate with the clamping screws 28. The clamping members 24 and 25 also have forwardly extending semi-spherical extensions 29 and 30 respectively which clamp frictionally the end 31 of the bracket member 6. The end 31 is preferably provided with an apertured plug 32. The conductor 33 containing the leads 16 extends through the aperture of the plug 32 and also through the bore 23 to the illuminating means provided within the casing 21. By screwing the clamping members 24 and 25 together by means of the screws 28, any desired friction may be placed between the clamping members and the spherical member 22 and the end of the bracket member 6. In this way the combined mirror and direction indicator may be located at any desired position and at the same time the conducting means for the leads 16 are entirely encased and protected from weather conditions.

In Figures 10, 11 and 12 a further modification is shown wherein the direction indicator is combined with a transparent mirror which serves as the rear view mirror upon a vehicle. In this construction the direction indicator appears when illuminated upon the transparent mirror itself and is visible from the rear.

In this construction the bracket member 6 is similar to that previously described with the universal joint 7, and the spherical member is secured to a cylindrical casing element. Rotatively mounted upon the element 34 and frictionally secured thereto is the cooperating casing element 35. The element 35 is provided with enlarged slots 36 connected by webs 37 so that when the element 35 is rotated manually with respect to the cylindrical portion 34, the universal joint 7 and cooperating elements will not obstruct such rotation. Upon the casing element 35 at the front face 38 thereof is cut out the direction indicator 39 which in the same manner as previously described with the other modifications, is covered by a translucent member 40. The rear face of the casing 35 has secured thereto in any desired way a transparent mirror 41, and immediately in back of such transparent mirror is a stencil member such as shown in Figure 19 at 42, upon which is cut out the direction indicator. Immediately in back of the stencil 42 is a sheet of transparent material 43 which may be of red paper or red translucent material.

Within the casing elements 34 and 35 is located the illuminating means such as 44 and such illuminating means are connected by leads 45 which extend through the bracket member 6 to the battery of the vehicle. In this case also a blinker is associated with such leads so that the direction indication is intermittently operated when placed in action by the driver.

In this modification ordinarly when the illuminating means 44 is not in operation, the transparent mirror 41 serves as a rear view mirror. However, when the light 44 is lighted, then the direction indicator 39 is illuminated and is visible from in front of the vehicle, while towards the rear of the vehicle the direction indicator 46 appears upon the transparent mirror itself, preferably in red. This is because the illumination from the bulb passes through the translucent sheet 43 and is outlined by the stencil 42 upon the transparent mirror 41 itself. In this case also only two combined mirrors and direction indicators are necessary, one on each side of the vehicle.

In Figures 13, 14 and 15 a similar construction is shown except that the transparent mirror 47 is of rectangular configuration, and in this case the frictional rotation provided between the element 34 and the element 35 of the modification shown in Figures 10, 11 and 12 which allows the direction indicators to be adjusted so as to extend horizontally at all times has been omitted.

In this construction the direction indicator 48 is cut out from the front face 49 of the casing 50 and is covered by a translucent material 51. The casing 50 has secured at the rear thereof the transparent mirror 47 and such mirror has associated therewith elements 42 and 43 of rectangular configuration. The operation in this case is the same as that in the modification shown in Figures 10, 11 and 12.

In Figures 16, 17 and 18 a further modification is shown which is similar to the modification shown in Figures 10 and 13 with the exception that a partition member 52 extends vertically through the central portion of the combined rear view and direction indicator. Because of the partition 52 direction indicators for both right and left turnings may be provided in the same device. As shown in Figure 16 which illustrates the front view of such a construction, one direction indicator 53 is cut from the front face 54 of the casing 55 and at the other side of the partition 52 another direction indicator 56 is cut pointing in the opposite direction. In the transparent mirror section towards the rear the stencil 42 cooperating with the transparent mirror 57 is provided with a stencil cut-out 58 pointing in one direction and also with a stencil cut-out 59 pointing in the other direction. In this construction a light 60 is provided in one compartment formed by the partition 52 and a light 61 is provided in the other compartment. In this case separate leads run from the lights 60 and 61 through the bracket member 6 to the power supply.

The construction shown in Figures 16, 17 and 18 permits the use of only a single combined rear view mirror and indicating means for a vehicle instead of the usual four now in use. Also, the direction indicators to the rear of the vehicle are not visible at all when not in operation and, when operated, quickly attract the attention of drivers of following vehicles.

Figure 19 shows the general method of assembling the constructions such as shown particularly in Figures 13 to 18 inclusive. The casing as shown in Figure 19 may be constructed of two cooperating portions such as 62 and 63.

The casing element 62 is provided with an inturned flange 64 while the casing element 63 open at the front has an inturned flange 65. The transparent mirror 66 together with the stencil member 42 preferably of black paper with the indicating means cut out therein and the translucent member 43 are clamped between the flanges 64 and 65 when the device is assembled by any desired means. The illuminating means is shown at 67 and a blinking device may be associated therewith or omitted, as desired. Also, the signaling indicia may be cut from the silvering upon a normal mirror and a translucent member such as red paper may be secured over such cut out portion upon the silver.

In the following claims the term direction indicator means any configuration such as an illuminated arrow, an illuminated frame partly or completely surrounding the mirror or any illuminated geometrical figure or character.

Various modifications may be made in the construction outlined above, but it is intended that all modifications are claimed as fall within the spirit of the following claims.

I claim:
1. A combined rear view mirror and signal device for motor vehicles and the like comprising a casing, a direction indicator cut from said casing at the front thereof and at the rear thereof, translucent material covering said cut-outs, a transparent mirror fixed to said casing at the rear thereof and means for illuminating intermittenly said direction indicators so that said indicators are visible both from the front and the rear of the vehicle.

2. A combined rear view mirror and signal device comprising a casing, a partition extending through said casing dividing the same into two compartments, said casing having at its front a direction indication cut-out for indicating turnings in both directions, a transparent mirror fixed to said casing at the rear thereof, a stencil having two direction indications therein located at the rear of said mirror, a translucent member associated with said stencil and illuminating means for each compartment under the control of the driver of the vehicle so that a single direction indicator and rear view mirror will indicate directions of turnings to both the rear and the front.

ANTOINE GAZDA.

REFERENCES CITED

The following references are of record in the file of this patent:

UNITED STATES PATENTS

| Number | Name | Date |
|---|---|---|
| 1,349,191 | Duncomb | Aug. 10, 1920 |
| 1,368,644 | Mochizuki | Feb. 15, 1921 |
| 1,401,988 | Knapp | Jan. 3, 1922 |
| 1,465,950 | Schiller | Aug. 28, 1923 |
| 1,611,066 | Preston | Dec. 14, 1926 |